United States Patent Office 3,412,476
Patented Nov. 26, 1968

3,412,476
PLANT FOR TREATING PRODUCTS WITH AIR
AS A TREATING AGENT
Sture Astrom, Halsingborg, Sweden, assignor to
Frigoscandia AB, Halsingborg, Sweden
Filed Mar. 13, 1967, Ser. No. 622,767
Claims priority, application Sweden, Mar. 15, 1966,
3,402/66
5 Claims. (Cl. 34—147)

ABSTRACT OF THE DISCLOSURE

A plant for treating various products such as foodstuffs with air as a treating agent comprises a treatment chamber in which a perforated endless conveyor belt travels for conveying the products to be treated along at least one path of helical convolutions to expose them to the treating air which is brought to flow along said helically extending path in the treatment chamber between inner and outer cylinders therein, which define between them a duct in which the conveyor belt travels, thereby covering the entire cross section of the duct.

According to the invention, such plant is characterised by the fact that the path of helical convolutions in which the perforated conveyor belt travels is bordered by an inner cylinder and an outer cylinder defining a duct between them through which the air caused to flow and the cross section of which is covered by the helically extending perforated conveyor belt. A plant having said duct provides a very efficient treatment of the products, fundamentally an operation for cooling or heating the products. Also, the efficiency of the treatment is dependent upon the effective cross-sectional area of the duct, which is determined by the nature of the perforated conveyor belt and the density of the products carried thereon.

The above and further features will become apparent from the following detailed specification in which reference is made to the accompanying drawings illustrating two embodiments, chosen by way of example, of the plant according to the invention.

Figure 1:
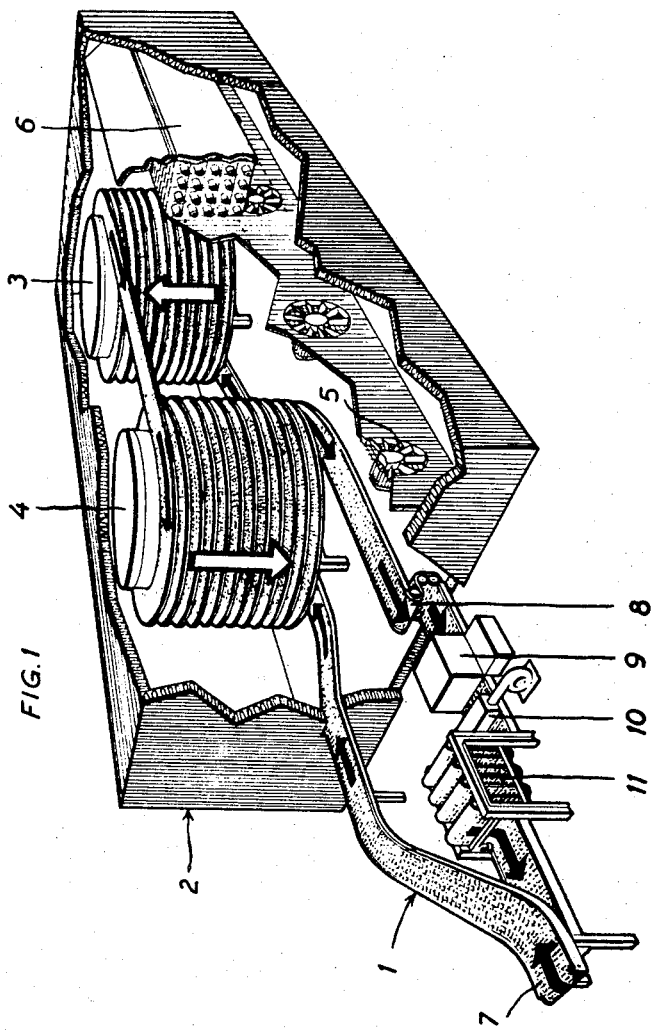
FIGURE 1 is a perspective view of the plant, the side walls and top wall of which have been partly broken away to show the interior of the plant.

The plant is a freezing plant for foodstuffs and like products, which comprises a perforated endless conveyor belt 1 for the products. The conveyor belt 1 may fundamentally be conidered as a chain and is of such a design as to permit describing curves in its own plane whereby the plant can be made very compact. In the embodiment illustrated the conveyor belt 1 is arranged to travel in two entirely separate paths running in several helical convolutions, said paths being defined on the inner side by cylinders 3 and 4, which are adapted to rotate about their axes. The cylinders 3, 4 are preferably driven, constituting the drive for the conveyor belt or being parts of said drive.

The freezing chamber 2 is equipped with fans 5 for causing air or gas employed for the freezing operation to flow through the cooling system 6.

Part of the conveyor belt 1 is located outside freezing chamber 2. Disposed on this part is the receiving station 7 for the products to be frozen, and the delivery station 8 for the frozen products. Associated with said part of the conveyor belt are a washing apparatus 9, a drying apparatus 10 for the conveyor belt 1 and an equalizing device 11 for the belt.

Figure 2:
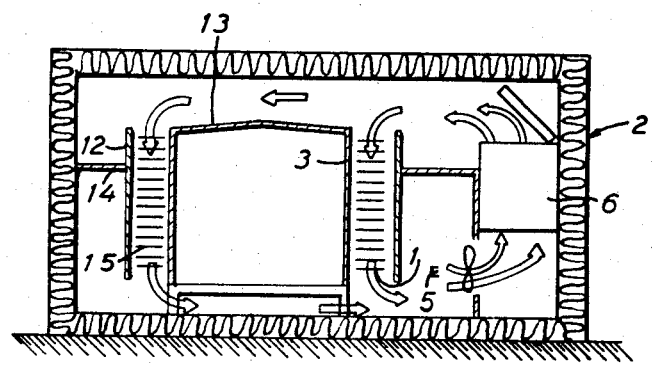
FIGURE 2 is a cross sectional view of the plant in one embodiment thereof.
Figure 3:
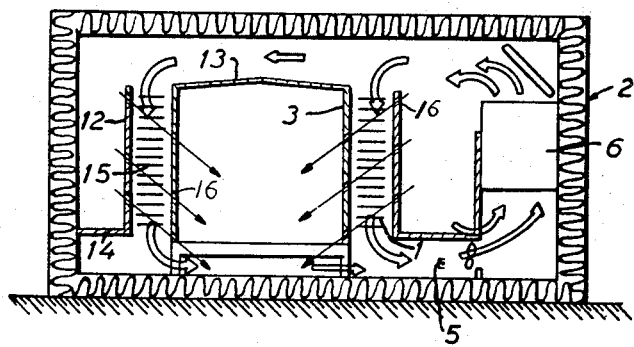
FIGURE 3 is a cross sectional view of the plant in the other embodiment thereof.

As will be seen in FIGURES 2 and 3, the path which runs in several helical convolutions and in which the perforated conveyor belt 1 travels, is defined by the aforementioned inner cylinder 3 and an outer cylinder 12, said inner cylinder 3 being rotatable. The cylinder 3 has a closed end wall 13 and a barrier 14 is provided between the outer cylinder 12 and the walls of the freezing chamber 2, whereby the air leaving the cooling system 6 will flow downwards through the duct 15 between the cylinders 3 and 12, the cross sectional area of which duct is covered by the perforated conveyor belt 1.

The conveyor belt 1 is adapted, when traveling through the cylinder 3, to move the products in the duct 15 from the bottom thereof in an upward direction, as will appear from FIGURE 1. As the air, however, flows from above in a downward direction there will result a counter-current relation extremely favourable for the freezing cycle proper. In the duct 15 at the other cylinder 4 the products and the air will move in the same direction, that is, from above in a downward direction, which makes for an extremely satisfactory result of the continued freezing cycle. In other words, the air flows in parallel through the two ducts 15 between the inner and outer cylinders to the two helically extending paths.

The embodiment shown in FIGURE 3 differs from that in FIGURE 2 first of all in that both the outer cylinder 12 and the inner cylinder 3 has through holes 16 for controlling the flow of air through the duct 15 between the cylinders 3 and 12. The air enters through the holes of the outer cylinder 12 and leaves through those of the inner cylinder 3, as is illustrated by the single arrows. The double arrows indicate the main flow paths. To permit the air to flow into the holes in the outer cylinder 12 the barrier 14 in this embodiment has been provided at the lower end of the cylinder 12.

The position and size of the holes in the two cylinders 3 and 12 are determined from case to case so that the best effect is gained. It may be sufficient in certain cases to provide but one of the two cylinders 3 and 12 with holes for controlling the flow of air through the duct 15 between the cylinders 3 and 12.

In the embodiments illustrated the helically extending path is of circular cross section. However, the path need not necessarily be circular but may substantially have oval shape. Thus, it may be composed of two spaced semicircles connected by straight portions.

While the invention has been described above and shown in two preferred embodiments it is readily understood by those skilled in the art that variations and modifications may be resorted to within the scope of the appended claims.

What I claim and desire to secure by Letters Patent is:

1. A plant for treating products such as foodstuffs with air as a treating agent, comprising a perforated endless conveyor belt for conveying the products through the treatment chamber in at least one path which runs in several helical convolutions, wherein said path of helical convolutions in which the perforated conveyor belt travels is bordered by an inner cylinder and an outer cylinder defining a duct between them through which the air is caused to flow from one end of said duct to the other, the cross section of said duct being covered by the helically extending perforated conveyor belt.

2. A plant as claimed in claim 1, in which the air is caused to flow through the channel between the cylinders in a direction opposite to that in which the helically extending conveyor belt conveys the products through said duct.

3. A plant as claimed in claim 1, having two paths which run in several helical convolutions and in which the conveyor belt travels, wherein the two paths are entirely separated from one another and defined by inner and outer cylinders.

4. A plant as claimed in claim 3, in which the air is caused to flow in parallel through the two ducts between the inner and outer cylinders to the two helically extending paths.

5. A plant as claimed in claim 1, in which the inner cylinder is rotatable.

References Cited

UNITED STATES PATENTS

| 3,133,798 | 5/1964 | Feld et al. | 198—136 XR |
| 3,269,142 | 8/1966 | De Mola et al. | 62—381 |
| 3,315,492 | 4/1967 | Dreksler | 62—381 |

FREDERICK L. MATTESON, JR., *Primary Examiner.*

A. D. HERRMANN, *Assistant Examiner.*